United States Patent
Keithley

(10) Patent No.: US 8,405,880 B1
(45) Date of Patent: Mar. 26, 2013

(54) METHOD AND APPARATUS FOR PROCESSING IMAGE DATA FOR AN IRREGULAR OUTPUT SCAN PATH

(75) Inventor: Douglas Keithley, Boise, ID (US)

(73) Assignee: Marvell International Ltd., Hamilton (BM)

(*) Notice: Subject to any disclaimer, the term of this patent is extended or adjusted under 35 U.S.C. 154(b) by 37 days.

(21) Appl. No.: 13/274,900

(22) Filed: Oct. 17, 2011

Related U.S. Application Data

(63) Continuation of application No. 12/070,237, filed on Feb. 14, 2008, now Pat. No. 8,040,555.

(60) Provisional application No. 60/890,090, filed on Feb. 15, 2007.

(51) Int. Cl.
*G06K 15/12* (2006.01)
*G06F 15/00* (2006.01)

(52) U.S. Cl. .......... 358/3.26; 358/1.5; 358/1.9; 358/1.7; 358/300; 358/444; 358/494; 358/474; 358/471; 358/514; 358/505; 347/132; 347/247; 347/248; 382/313; 382/294; 382/167

(58) Field of Classification Search .................. None
See application file for complete search history.

(56) References Cited

U.S. PATENT DOCUMENTS

| | | | |
|---|---|---|---|
| 6,104,845 A * | 8/2000 | Lipman et al. | 382/313 |
| 6,188,801 B1 | 2/2001 | Tsai et al. | |
| 6,229,555 B1 | 5/2001 | Hadady et al. | |
| 6,323,955 B1 * | 11/2001 | Kanai et al. | 358/1.17 |
| 6,359,640 B1 | 3/2002 | Ravitz et al. | |
| 6,556,315 B1 * | 4/2003 | Kommrusch et al. | 358/473 |
| 7,046,861 B2 * | 5/2006 | Imaizumi et al. | 382/294 |
| 7,349,123 B2 | 3/2008 | Clarke et al. | |
| 7,375,738 B2 * | 5/2008 | Corbett et al. | 347/234 |
| 7,639,407 B2 | 12/2009 | Clarke et al. | |
| 2004/0120017 A1* | 6/2004 | Miller | 358/474 |
| 2009/0257073 A1 | 10/2009 | Pham | |

* cited by examiner

*Primary Examiner* — Steven Kau
*Assistant Examiner* — Pawandeep Dhingra

(57) ABSTRACT

Methods, algorithms, software, apparatuses and systems for processing image data for imaging devices having irregular scan paths (e.g., scan paths that deviate from a conventional horizontal and/or straight line). The irregular scan paths generally correspond to actual locations of a line of output from an image output device (e.g., a printer). The method generally includes steps of selecting one or more of the input pixels, correlating a location of the selected pixel with a location on an irregular scan path, and producing an adjusted pixel based on a value of the selected pixel, the location on the irregular scan path, and/or values of one or more pixels near the selected pixel.

20 Claims, 5 Drawing Sheets

FIG. 3

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
301 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1 | P1
302 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2 | P2
303 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | P3 | S1
304 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | P4 | S2
305 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | D0 | S3
306 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | D1 | S4
307 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | D2 | S5
308 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | D3 | S6
309 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4 | D4
310 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5 | D5

330: 0.00 0.15 0.30 0.45 0.60 0.75 0.90 1.05 1.20 1.35 1.50 1.65 1.80 1.95 2.10 2.25 2.40 2.55 2.70 2.85 3.00 3.15 3.15 3.15 3.15 3.00 2.85 2.70 2.55 2.40 2.15

340: 0.15 0.30 0.45 0.60 0.75 0.90 0.75 0.60 0.45 0.30 0.20 0.35 0.50 0.65 0.80 0.55 0.70 0.55 0.40 0.25 0.10 0.25 0.40 0.55 0.15 0.15 0.15 0.15 0.65 0.90 0.40 0.15

Labels: 320, 322, 324, 326

FIG. 6
FIG. 7

METHOD AND APPARATUS FOR PROCESSING IMAGE DATA FOR AN IRREGULAR OUTPUT SCAN PATH

RELATED APPLICATIONS

This application is a continuation of U.S. application Ser. No. 12/070,237, filed Feb. 14, 2008, which claims the benefit of U.S. Provisional Application No. 60/890,090, filed Feb. 15, 2007. The disclosures of the applications referenced above are incorporated herein by reference.

FIELD OF THE INVENTION

The present invention generally relates to the field of image processing. More specifically, embodiments of the present invention pertain to methods and apparatuses for processing image data for imaging devices that have irregular image scan paths.

DISCUSSION OF THE BACKGROUND

Image data provided to an imaging device must follow the image scanning path that the imaging device follows as it produces images on media, either directly or indirectly, so that the imaging device forms the correct portion of the image at the correct location. A laser scanner assembly in a laser printer is an example of an imaging device that indirectly produces images to be printed on a medium such as paper by producing an electrically charged image on a photoconductive drum, which then attracts charged toner particles that are subsequently transferred to charged paper before the particles are fused to the paper by heat and pressure.

Laser scanners typically form images on drums by scanning the drum line by line in a horizontal path, from left to right or vice versa. A one dimensional, unidirectional (e.g., horizontal) scan path is well-suited to image data stored in rectangular pages in raster format. Image data necessary for the imaging device to form one line (e.g., row) of the image is commonly referred to as a scan line. Since such image data is stored sequentially as horizontal scan lines, the image data is processed sequentially before it is provided to the horizontal laser scanner. Thus, as an image processor processes image data for an imaging device, it sequentially follows the scan path of the imaging device through the array of image data stored in memory.

When processing image data, an image processor typically operates on a window of the image comprising several scan lines, as opposed to operating on scan lines in isolation. A window of an image, for example, allows the image processor to identify patterns in the image (e.g., a solitary dot versus a series of dots), in order to make improvements or corrections to the image by adjusting the image data provided to the imaging device. Traditionally, a five-line image window of two scan lines above and two scan lines below the scan line being processed is sufficient for such purposes.

Generally a direct memory access (DMA) device or other memory access device accesses image data from main memory for an image processor. Working memory or cache, such as a synchronous random access memory (SRAM) first in first out (FIFO) or other buffer may be used to temporarily hold a scrolling window of image data. As each scan line of the image is processed, one scan line drops off and a new scan line is added to the buffer.

However, a problem arises where the image forming path (i.e., the scan path) of an imaging device is not one-dimensional (e.g., straight and/or horizontal), but instead is irregular and/or non-uniform. Such an irregular scan path may include curves, slopes, discontinuities and/or any other departure from a straight and/or horizontal line. Processing scan paths by the traditional method would consume an inordinate amount of resources. Further, image data may not be compatible with the scan path (e.g., it may be misaligned). For example, if a scan path traversed 80 horizontal lines (or rows) of the image, then processing each scan line using the traditional image window would require an 84 image line buffer to maintain a window around the scan line data. Thus, for 600 dpi color printing on 8.5-inch wide, letter-sized paper, employing the traditional technique would require approximately 400 kB of buffer memory for each color plane. Further, if the image data is in common raster format, then it is not directly compatible with scan lines that traverse numerous lines of image data.

It may therefore be advantageous to determine an alternative to the traditional image processing technique for horizontal scan lines in order to reduce costs that would otherwise be associated with processing image data for multi-dimensional scan lines.

SUMMARY OF THE INVENTION

Embodiments of the present invention relate to methods, algorithms, software, apparatuses and systems for processing image data for imaging devices having irregular scan paths (e.g., scan paths that deviate from a conventional horizontal and/or straight line). The irregular scan paths generally correspond to actual locations of a line of output from an image output device (e.g., a printer). In one embodiment, the method includes steps of selecting one or more of the input pixels, correlating a location of the selected pixel with a location on an irregular scan path, and producing an adjusted pixel based on a value of the selected pixel, the location on the irregular scan path, and values of one or more pixels near the selected pixel.

In a further embodiment, the method includes obtaining a description of the irregular scan path. The description of the irregular scan path may comprise an integer offset value and a fractional offset value for each of a plurality of pixel locations in the irregular scan path. The integer offset value may represent a distance from a baseline (e.g., an approximate, whole number of pixels above or below a base line where an actual output pixel will be produced) and the fractional offset value represents a distance between the integer offset value and one of the pixel locations in the irregular scan path (e.g., a remainder of the actual distance above or below the base line).

Producing the adjusted pixel may be further based on the fractional offset value for a pixel location in the irregular scan path corresponding to the selected input pixel (e.g., where an actual output pixel lies between two pixels of a desired output image, the actual output image may be interpolated or otherwise calculated with a weighting based on the fractional offset value). After the adjusted pixels are produced, the method may comprise retrieving an adjusted pixel from an adjusted line of pixels, where the adjusted line corresponds to the integer offset value for an output location on the scan path. Thus, in a first pass the method generally adjusts a row of input pixels based on the values of surrounding pixels and to correct for misalignments between the scan path and the input image pixel locations, and in a second pass the method retrieves and/or collects the previously adjusted pixels along the output scan path.

In the first pass, lines of input pixels of the input image may be selected and the correlating and producing steps may be performed for each pixel in the line of input pixels to produce a line of adjusted pixels. Thus, the method may also include retrieving the line of input pixels from a memory, and may also include retrieving one or more lines of input pixels above and below the current input line (e.g., using a FIFO buffer). Finally, the first stage may include storing to a memory the line of adjusted pixels corresponding to the line of input pixels.

Due to burst boundary requirements of conventional memory devices, it may be desirable to select the integer offset values of each of the pixel locations in the irregular scan path such that the size of each sequential subset of the pixel locations having equal integer offset values satisfies a burst boundary of the memory device. In a further embodiment, the second pass includes, for each of the sequential subsets, retrieving from the memory device a plurality of adjusted pixels from an adjusted line of pixels corresponding to the integer offset value.

The software, architectures, and/or systems generally comprise those that embody one or more of the inventive concepts disclosed herein. The invention may be encoded in a computer-readable medium comprising a computer executable set of instructions adapted to perform the present methods. In addition, the invention relates to a controller in an image output device configured to perform the present methods. The controller may be configured with software, firmware, dedicated circuits, and/or any other method available to a person skilled in the art.

The invention also relates to an image output apparatus comprising a memory (e.g., DRAM memory with a DRAM controller), an output engine configured to produce an output image by producing output pixels along non-uniform scan path, and a controller configured to perform the present methods. The output engine may, for example, comprise a laser printer engine. The apparatus may be configured to retrieve a description of the irregular or non-uniform scan path. The description may be stored at the time of manufacturer, or the apparatus may include means for measuring the scan path (e.g., when the devices starts up and/or before a print operation begins.

The present invention advantageously allows for processing an input image for an output device with an irregular scan path using only enough working memory (e.g., relatively expensive SRAM) for a small number of pixel rows (e.g., a current input row and a small number of rows above and/or below the current input row) even if the irregular scan path traverses a large number of rows in the output image.

BRIEF DESCRIPTION OF THE DRAWINGS

FIG. 3 is a diagram showing a portion of exemplary irregular scan paths deviating from exemplary image data rows.

FIG. 6 is a diagram of an exemplary second pass processing path according to an exemplary embodiment of the present invention.

FIG. 7 is another diagram of an exemplary second pass processing path according to an exemplary embodiment of the present invention.

DETAILED DESCRIPTION OF THE PREFERRED EMBODIMENTS

Figure 1:
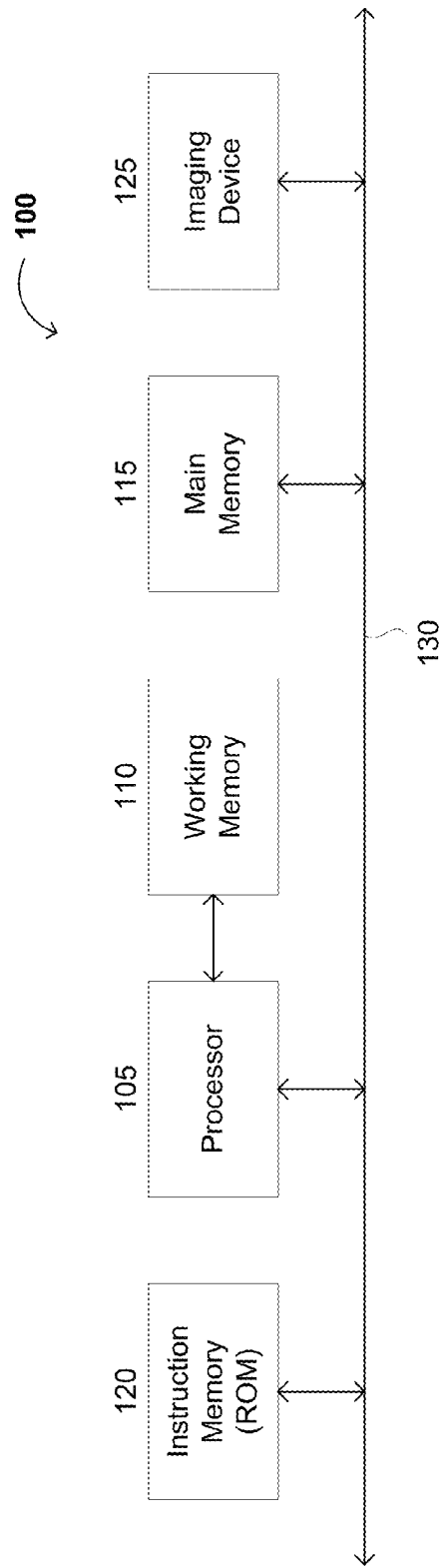
FIG. 1 is a block diagram of an exemplary imaging system in which the present invention may be used.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

In addition, the terms "irregular scan path" and "non-uniform scan path" may be used interchangeably to refer to scan paths in an image output device that deviate from a straight and/or horizontal scan path. Such deviations may include curves, slopes, discontinuities and/or any other departure from a straight and/or horizontal line.

The invention, in its various aspects, will be explained in greater detail below with regard to exemplary embodiments.

An Exemplary System for Processing Image Data for a Multi-Dimensional Scan Path

FIG. 1 is a block diagram of an exemplary imaging system in which the present invention may be used. FIG. 1 is a simplified block diagram of an exemplary generic imaging system 100 in which at least some hardware, firmware and/or software embodiments of the present invention may be implemented. Exemplary imaging system 100 comprises processor 105, optional working memory 110, main memory 115, processor instruction memory 120, imaging device 125 and bus 130.

Exemplary imaging system 100 comprises any imaging equipment having a scan path, e.g., laser printer, copier, but may include other equipment (e.g., a host computer with a display device). Image data may be provided to exemplary imaging system 100 by an external source (not shown) such as a personal computer, camera, cellular or mobile phone, personal digital assistant (PDA), etc. over a local or network connection. Image processor 105, optional working memory 110, main memory 115 and image processor instruction memory 120 may reside in imaging equipment or in equipment external to the imaging equipment such as a personal computer or other device, or may be distributed as opposed to co-located.

Processor 105 executes image processing instructions, perhaps among other instructions, stored in processor instruction memory 120. Processor 105 may comprise a general purpose processor or dedicated image processor. In some embodiments, processor 105 may form the core of an image processing application specific integrated circuit (ASIC) or system on a chip (SoC).

Working memory 110, often referred to as cache or buffer, is optional. In some embodiments, working memory 110 may be incorporated in and/or physically close to processor 105. Working memory 110 provides temporary storage for part or all image or other data required by instructions being executed by processor 105. In some embodiments, working memory 110 may comprise static random access memory (SRAM).

Main memory 115 may store all or part of the data pertaining to an image, which, in some embodiments, may be supplied by a personal computer or other device through a communication interface (not shown). Image data stored in main memory 115 may be randomly accessed and/or modified by processor 105. In some embodiments, main memory 115 may comprise dynamic random access memory (DRAM), a hard disc, an optical storage medium (e.g., CD-ROM, DVD, and/or or any similar medium), etc.

In some embodiments, main memory 115 may store image data in the form of high level image data or descriptions (e.g., any of the various page description languages [PDLs] known to those skilled in the art) or low level image pixel data (e.g., bitmap or raster image data stored in one dimensional lines or rows of an image). In some embodiments, image processing instructions executed by processor 105 may convert or otherwise modify image data stored in main memory 115.

In some embodiments, main memory 115 may also store image processing parameters (e.g., parameters pertaining to image processing speed or image quality). These parameters may be generated automatically by executing image processing instructions (e.g., by detecting optimal run lengths for memory) and/or manually (e.g., by user input data entered through a mouse or keyboard coupled to a personal computer in response to a graphical query generated by a printing program).

Imaging device 125 comprises, for example, a laser scanner assembly or any other image generator having a scan path (e.g., ink jet printers, line printers, etc.). Imaging device 125 forms images directly or indirectly on media using a multi-dimensional scan path. Whether the multi-dimensional scan path is intentional or not is irrelevant to the invention. In some embodiments, the scan path of imaging device 125 may be fixed, while in other embodiments the scan path may be variable. In some embodiments, imaging device 125 and/or exemplary imaging system 100 may comprise one or more sensors (not shown) to detect the scan path or changes in it. In some embodiments, this may result in static or dynamic changes in the scan path.

Bus 130 comprises a communication link between the functional blocks shown in FIG. 1. In some embodiments, bus 130 may comprise one or more localized and/or extended (e.g., network) bus for transmission of data, addresses, instructions and other information. The particular implementation of the data bus configuration is not necessarily relevant to the present invention.

Processor instruction memory 120 stores image processing instructions for execution by processor 105. Processing instructions may comprise firmware and/or software instructions. In some embodiments, processor instruction memory 120 may comprise read only memory (ROM). In addition, image processing instructions according to the present invention may comprise only a subset of the image processing instructions stored in instruction memory 120. For example, some image processing instructions may be dedicated to rasterizing a high level page description of an image.

An Exemplary Method of Processing Image Data for an Irregular Scan Path

Figure 2:
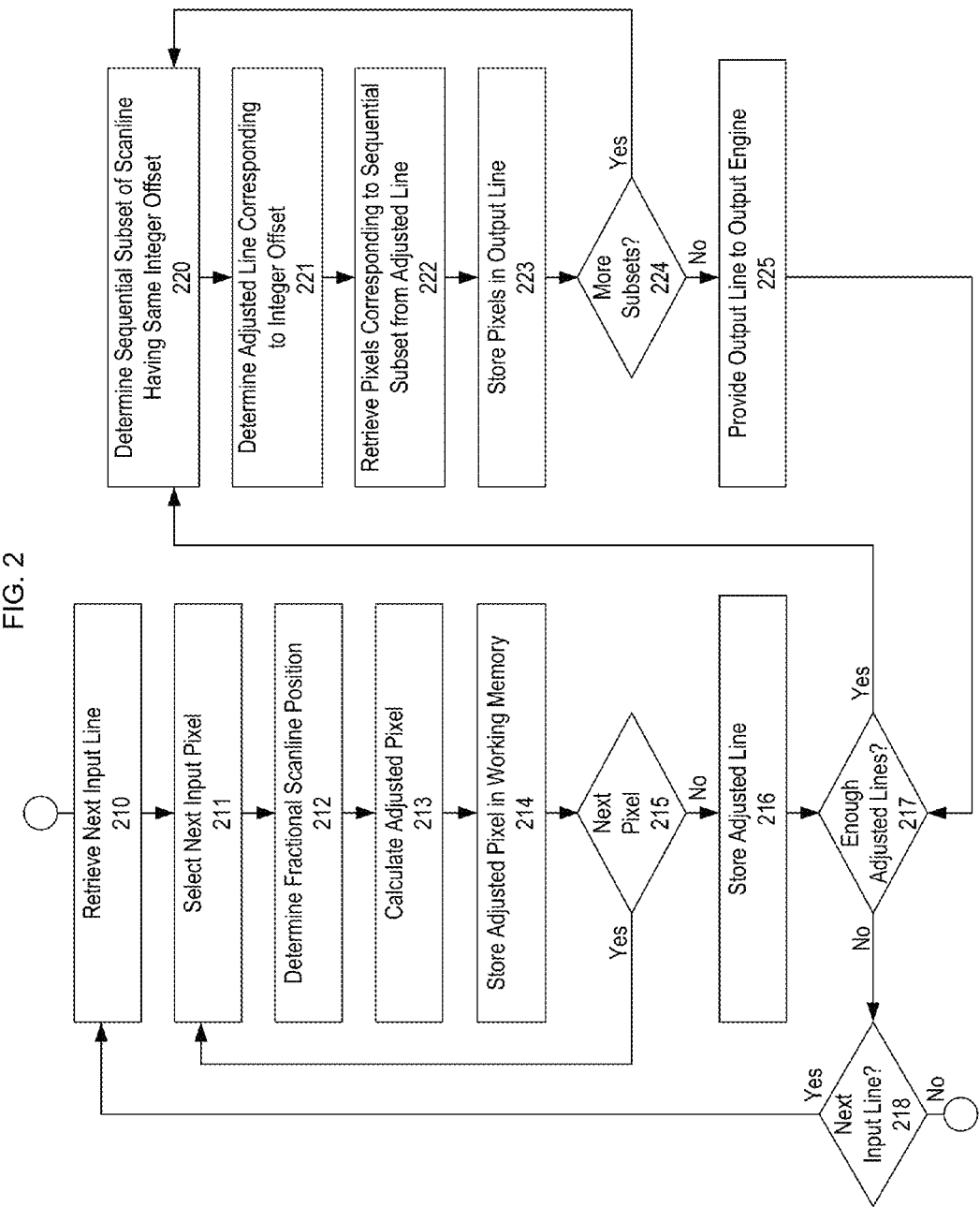
FIG. 2 is a flowchart showing a method according to the present invention.

FIG. 2 is a flowchart showing an embodiment of a method for processing image data for an imaging device having an irregular scan path. The irregular scan path generally corresponds to actual locations of a line of output from an image output device (e.g., a printer), where the line of output from the device does not follow a horizontal and/or straight line across the page or other output medium. The method generally operates in two passes. The first pass, comprising steps 210-217, generally reads in one or more lines of input pixels of the input image to produce lines of adjusted pixels based on both the value of nearby pixels and on the "local" shape of the scan path. The second pass, comprising steps 220-225, generally reads blocks of adjusted pixels to produce a line of pixels to be output along the irregular scan path.

Referring now to FIG. 3, an exemplary array of input pixels in an input image 300 is shown. Input image 300 has data for pixels in rows 305-310, and may also include padding rows 301-304. Scan lines 320, 322, 324, and 326 each show an irregular scan path traversing image 300. Rows 330 and 340 each show a deviation of the scan path from a base line at each pixel location in the row. Row 330 shows the full distance between the base line and the actual scan line position. For example, scan line 320 starts in the middle of data row 307 for a deviation at the first pixel position of 0.00. At the fourth pixel position, the deviation is 0.45 pixels from the baseline. At the fifteenth pixel position, the deviation is 2.10 pixels from the baseline. Row 340 shows a "fractional" distance (e.g., a remainder of the distance beyond an integer number of rows). For example, the fractional distance at the fourth pixel position is 0.45 pixels, and the fractional distance at the fifth pixel is 0.60 pixels.

Referring again to FIG. 2, steps 210-218 generally iterate through the rows of an input image. At step 210, a line of input (e.g., input image row 307 of FIG. 3) is read from memory (e.g. from main memory 115 of FIG. 1). Steps 211 through 215 generally iterate through all of the pixels in the input line. Thus, at step 211, the next input pixel (or the first input pixel in the first iteration) is selected. At step 212, a location of the selected pixel is correlated with a location on the irregular scan path to determine the fractional scan path position (e.g., the fractional distance shown in row 340 of FIG. 3). At step 213, an adjusted pixel is calculated. The value of the adjusted pixel may be based on a value of the selected pixel, the location on the irregular scan path, and values of one or more pixels near the selected pixel. Thus, in preferred embodiments the method also includes reading data for nearby input pixel rows into working memory in order to determine the adjusted pixels.

In a further embodiment, the method includes obtaining a description of the irregular scan path. The description of the irregular scan path may comprise an integer offset value and a fractional offset value for each of a plurality of pixel locations in the irregular scan path. The integer offset value may represent a distance from a baseline (e.g., an approximate, whole number of pixels above or below a base line where an actual output pixel will be produced) and the fractional offset value represents a distance between the integer offset value and one of the pixel locations in the irregular scan path (e.g., a remainder of the actual distance above or below the base line). Thus, the calculation at step 213 of the adjusted pixels may include, for example, interpolation of a pixel between a current input pixel and a nearby input pixel based on the fractional distance (e.g., a local variation) of the scan line from a base line (e.g., where an actual output pixel lies between two pixels of a desired output image, the actual output image may be interpolated or otherwise calculated with a weighting based on the fractional offset value).

Figure 4:
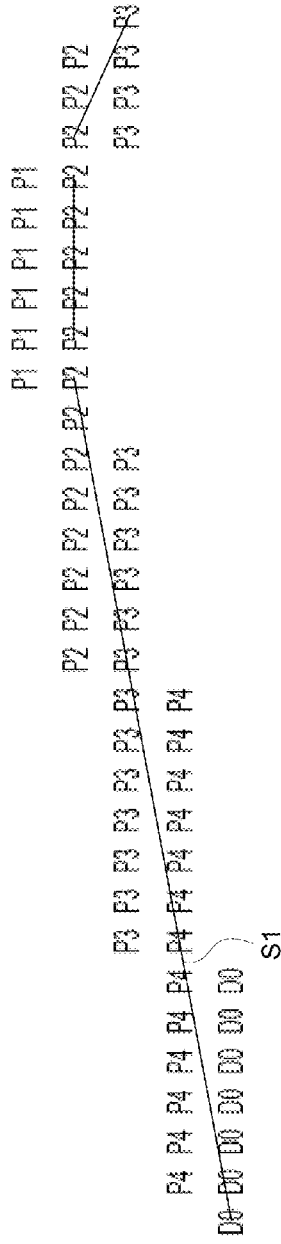
FIG. 4 is a diagram showing the isolation of an exemplary irregular image scan path over exemplary image data.

FIG. 4 is a diagram showing the isolation of an exemplary multi-dimensional image scan path in exemplary image data. As shown in FIG. 4, regardless how many image data lines the multi-dimensional scan path traverses, it can always be isolated between a few, in this embodiment two, image data lines. The first seven pixels of the multi-dimensional scan path are between image data line D0 and padded data line P4. The next seven pixels of the multi-dimensional scan path are between padded data lines P3 and P4. The next six pixels of the multi-dimensional scan path are between padded data lines P2 and P3. The next seven pixels of the multi-dimensional scan path are between padded data lines P1 and P2. The final four pixels of the multi-dimensional scan path are between padded data lines P2 and P3.

Figure 5:
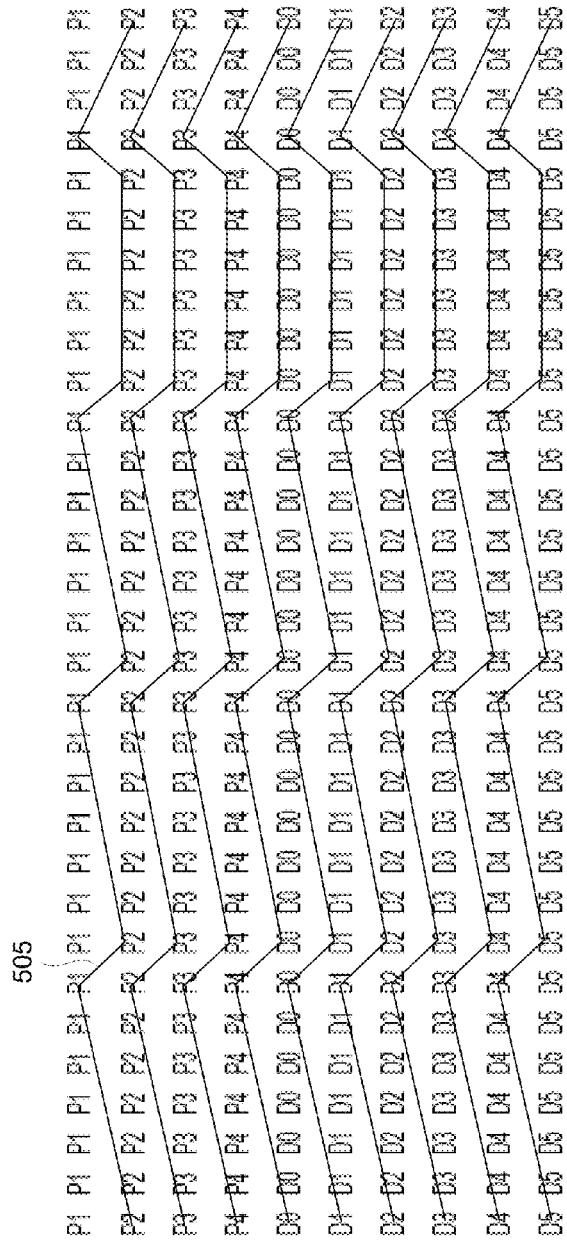
FIG. 5 is a diagram showing an exemplary first pass processing path according to an exemplary embodiment the present invention.

Referring now to FIG. 5, an exemplary first processing path 505 through the image is shown. Because the fractional value of the scan line localizes the range of pixels to be considered in calculating an adjustment, the first pass (steps 210-218) may proceed along a single input image row to produce the adjusted image row. Thus, referring again to FIG. 2, at step 214 each adjusted pixel may be stored in working memory (e.g., as the adjusted image row is produced). At step 215 the method determines whether there are any additional pixels in the current line. If there are additional pixels, then the method proceeds with another iteration of steps 211-215. If there are no more pixels in the current row, then at step 216 an adjusted row may be stored to a main memory. It will be recognized that, depending on the size of the working memory, it may not be necessary to store the adjusted line to main memory in each iteration.

At step 217, the method determines whether enough adjusted lines exist to begin the second pass of steps 220-225. If there are not enough adjusted lines then the method proceeds to step 218. At step 218 it is determined whether there are any more input lines. If there are no more input lines, then the first pass is complete. Otherwise, the first pass steps 210-218 are repeated. It will be recognized that the first and second passes may generally be run either sequentially or in parallel. For example, the first pass may run until adjusted pixels have been produced for the entire image. Alternatively, the first pass may run until enough rows of adjusted pixels have been produced to create an entire output line along the irregular scan path (e.g., if the scan path traverses 80 lines, then at least 80 lines of adjusted pixels would have to be produced before the second pass begins). In a single-processing environment, the first pass may be suspended while the second pass produces one or more output lines. In a multi-processing environment, the first and second passes may proceed in parallel as long as there are enough adjusted lines available for the second pass to operate.

In the second pass, comprising steps 220-225, the method generally reads blocks of adjusted pixels to produce a line of pixels to be output along the irregular scan path. At step 220, the method determines a sequence of pixels in the scan path having the same integer offset value (e.g., the integer portion of the scan path deviation shown in row 330). At step 221, the method determines which adjusted line corresponds to the integer offset value. At step 222, the sequential set of pixels having the same integer offset value is read from the adjusted line.

Figures 6, 7:
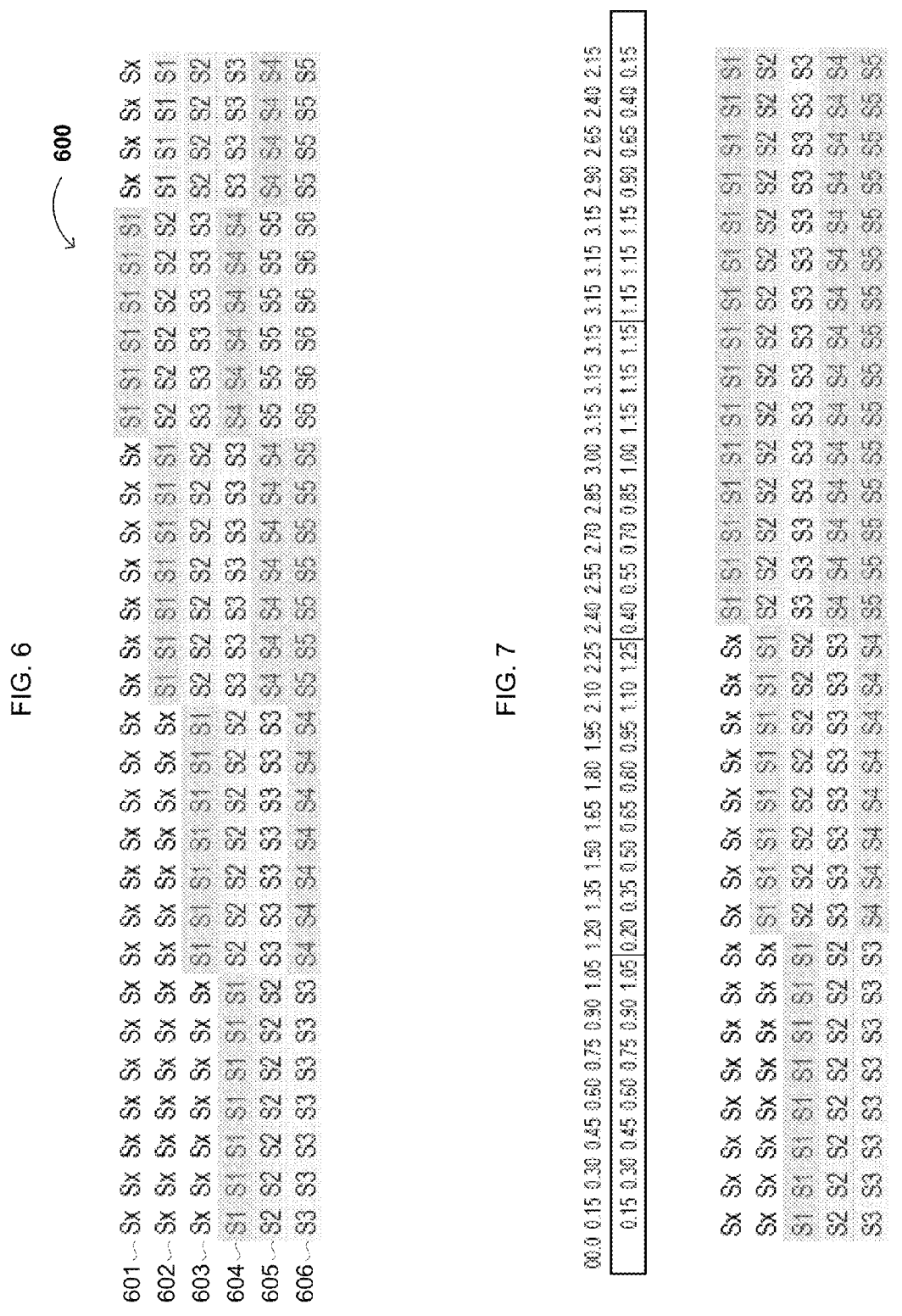

Referring now to FIG. 6, an array 600 of adjusted pixels (e.g., lines of pixels produced in steps 210-218) is shown. As shown in row 330 of FIG. 3, the first seven pixels of the scan path have an integer offset of 0. Thus, at step 220 the method may select the first seven sequential pixels of the scan path. At step 221, the method determines that the selected subset have a common integer offset value of 0. Therefore, at step 222, the first seven pixels of adjusted pixel row 604 corresponding to an integer offset of 0 may be selected. At step 223, the pixels are stored in memory to represent the first seven pixels of the output line. Alternatively, at step 223 the method may send the pixels directly to the output engine. At step 224, it is determined if any more pixels in the scan path need to be processed (e.g., whether more subsets of pixels remain). If there are more pixels in the scan path to process, then the method repeats loop 220-224.

Thus, in a next iteration of loop 220-224 the method may select the next seven pixels of the scan path, having an integer offset of one, as shown in row 330 of FIG. 3. Thus, at step 222 the method may retrieve seven pixels from adjusted row 603, corresponding to an integer offset of one. Similarly, the method may select the next seven pixels having an offset of two from adjusted line 602 in a third iteration, the next six pixels having an offset of three from adjusted line 601 in a fourth iteration, and the final four pixels having an offset of two from adjusted line 602 in a fifth iteration. When the entire output line corresponding to the irregular scan path has been read, then at step 225 the output line is provided to the output engine (e.g., to print a line on a page along the irregular scan path). The method then proceeds to step 217 to determine whether enough adjusted lines are available to produce another output scan line.

Due to burst boundary requirements of conventional memory devices, it may be desirable to select the integer offset values of each of the pixel locations in the irregular scan path such that the size of each sequential subset of the pixel locations having equal integer offset values satisfies a burst boundary of the memory device. In a further embodiment, the second pass includes, for each of the sequential subsets, retrieving from the memory device a plurality of adjusted pixels from an adjusted line of pixels corresponding to the integer offset value.

As will be observed in FIG. 6, scan path fragments specified by fractional deviations may yield variable run-length fragments. While this technique may help imaging device 125 produce better quality images, it may reduce the efficiency, e.g., speed, of imaging system 100. In other embodiments, the fractional deviation may vary from 0.0 to 1.0 to +/−0.5 or any other imaginable arrangement. However, while tighter deviation tolerances may generally result in more accurate image reproduction, tighter tolerances may also result in smaller variable run-lengths and less system efficiency depending on the trajectory of multi-dimensional scan paths. As previously noted, deviation tolerances may be fixed or statically or dynamically variable, e.g., where an image comprises mixed content such as graphics, text or other defining features of images that may or may not tolerate inaccuracies.

FIG. 7 is a diagram of exemplary fixed increment multi-dimensional scan path fragments within image data according to an exemplary embodiment of the present invention. In other embodiments, as shown in FIG. 7, run lengths of scan path fragments may be fixed, e.g. multiples of eight pixels. In some embodiments, achieving fixed run length fragments may require variable deviations between scan paths and image data lines. Run length fragments may also be mixed, such as where a selection algorithm mandates a fixed run length with an overriding maximum deviation. Some embodiments may investigate and determine the best course of action prior to processing image data. Forcing fixed run lengths may require additional working memory because multi-dimensional scan paths may jump more than one image data line if deviations between scan paths and image data lines are allowed to exceed one image data line.

Longer run lengths are significant, for example, if the memory system has significant performance impacts as a function of run length. For example, if the system was optimal with bursts of data for eight pixels, then forcing fixed run lengths of eight pixels may provide faster image processing performance compared to variable run-lengths.

Comparison of FIGS. 3, 6 and 7 illustrates that a fixed run length of eight pixels may result in fewer scan path fragments per image line. In FIG. 6, image data line D0 was broken into five scan path fractions while in FIG. 7, image data line D0 was broken into three scan path fragments. The particular multi-dimensional scan path shown in FIG. 1 may be well suited to fixed run length segments because fixed run lengths can be achieved with only slightly more deviation than one image data line. As shown by comparison of FIGS. 1 and 7, the deviation of the first 8 pixels is 1.05 lines. The deviation for the second eight pixels is 1.05 lines (i.e. 1.25 less 0.20). The deviation for the final 15 pixels is 1.0 lines (i.e. 1.15 less 2.15).

FIGS. 6 and 7 illustrate integer image data line deviations for each scan path stored in memory after fractional deviations have been resolved. FIGS. 6 and 7 illustrate how data may be written to and/or stored in memory. Complete scan paths may be assembled for imaging device 125, perhaps in a different stage of an image processing pipeline, by following scan paths through the image data in memory, reading out the scan path fragments for each scan path and assembling them in order for the scan path taken by imaging device 125.

It may be observed that processing the image data to select the fragments of the first scan path and the second scan path according to the multi-dimensional scan path and scan path fragment selection criteria may comprise, in some embodiments, nonsequential processing of the fragments of data for the first and second multi-dimensional scan paths. Traditionally, scan path data is processed sequentially. In the foregoing embodiments, depending on the processing sequence, multi-dimensional scan path data may be processed nonsequentially by processing fragments of other multi-dimensional scan paths out of order. Those of ordinary skill will also recognize that, at least in some embodiments, selection of scan path fragments may be only one process in an image data processing pipeline.

In some embodiments sensors and logic may be dedicated to the determination of the scan path. For the scan path to be usefully known may require calculations based on sensor data and/or other information about the trajectory of the scan path. In some embodiments, the trajectory may be part of the image processing instructions. In any event, the method recited in FIG. 2 assumes the scan path is known. Further, the orientation of image data relative to the scan path must be known. In some embodiments, during image processing image data may be rotated or otherwise reorganized relative to the scan path. The method recited in FIG. 2 assumes that the orientation of the scan path to the image data is known.

Exemplary Logic May be Encoded as Hardware, Firmware and/or Software

In other embodiments of the invention, other methods, algorithms, software, apparatus and systems, including program storage devices, generally comprise those that embody or are configured with, e.g., encoded with circuitry and/or computer executable instructions, one or more of the inventive concepts disclosed herein.

Embodiments of the present invention include algorithms, computer program(s) and/or software, implementable and/or executable in a general purpose or application specific computer configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

In some embodiments, the invention may be implemented in part or in full by programming firmware and/or software for one or more suitable general-purpose or application specific computers having appropriate hardware. The programming may be accomplished through the use of a computer-readable program storage device having encoded thereon a program of instructions executable by the computer for performing all or a portion of the operations in certain embodiments of the invention.

A program storage device or computer readable media may take the form of any fixed or removable storage medium that exists now or is subsequently developed, e.g., electric, magnetic, optical storage media. The program of instructions for execution by a computer may be object code (e.g., in a binary form that is executable more-or-less directly by a computer), source code (e.g., in a form that requires compilation or interpretation before execution), or some intermediate form such as partially compiled code. The precise forms of the program storage device and of the encoding of instructions thereon or therein are immaterial here.

The waveform is generally configured for transmission through an appropriate medium, such as copper wire, a conventional twisted pair wire line, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

It is well within the abilities of one skilled in the art to design and use logic configured to implement embodiments of the invention. It will be apparent to those of ordinary skill having the benefit of this disclosure that at least a portion or all of certain embodiments of the invention may be implemented by encoding logic in hardware, firmware and/or software. While various embodiments of the invention can be implemented in image processing instructions, they can also be implemented in logic (e.g., circuitry). The variety of physical embodiments available to implement the invention is not relevant.

CONCLUSION/SUMMARY

Thus, the present invention provides a method and apparatus for processing image data for imaging devices having irregular (e.g. not horizontal and/or straight) scan paths. The present invention advantageously allows for processing an input image for an output device with an irregular scan path using only enough working memory (e.g., relatively expensive SRAM) for a small number of pixel rows (e.g., a current input row and a small number of rows above and/or below the current input row) even if the irregular scan path traverses a large number of rows in the output image.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of processing, within an imaging system, an input image comprising a plurality of input pixels, the method comprising:

for each input pixel of the plurality of input pixels, determining, by the imaging system, an integer offset value with respect to pixel location in an irregular scan path;

for each input pixel of the plurality of input pixels, correlating, by the imaging system, a location of the input pixel with a pixel location in the irregular scan path to determine (i) a fractional offset value and (ii) a fractional scan path position;

for each input pixel of the plurality of input pixels, calculating, by the imaging system, an adjusted pixel that corresponds to the input pixel based on (i) a value of the input pixel, (ii) the correlated pixel location in the irregular scan path for the input pixel, (iii) the fractional offset value for the correlated pixel location in the irregular scan path, and (iv) values of one or more input pixels near the input pixel; and producing, by the imaging system, an output line by retrieving one or more subsets of sequential adjusted pixels, each subset having adjusted pixels that correspond to a same integer offset value.

2. The method of claim 1, wherein the irregular scan path corresponds to actual locations of a line of output from an image output device.

3. The method of claim 1, wherein the fractional scan path location and the fractional offset value are the same.

4. The method of claim 1, wherein the integer offset values of each of the pixel locations in the irregular scan path are selected such that the size of each subset of sequential adjusted pixels satisfies a burst boundary of a memory device.

5. The method of claim 4, further comprising, for each of the subsets of sequential adjusted pixels, retrieving from the memory device a plurality of adjusted pixels from an adjusted line of pixels corresponding to the integer offset value.

6. The method of claim 1, further comprising retrieving the one or more subsets of sequential adjusted pixels from a memory.

7. The method of claim 1, wherein calculating the adjusted pixel comprises interpolation of the adjusted pixel between the input pixel and a nearby input pixel based on the fractional offset value.

8. A non-transitory computer-readable medium comprising a computer executable set of instructions adapted to process an input image comprising a plurality of input pixels, the instructions including:

for each input pixel of the plurality of input pixels, determining an integer offset value with respect to pixel location in an irregular scan path;

for each input pixel of the plurality of input pixels, correlating a location of the input pixel with a pixel location in the irregular scan path to determine (i) a fractional offset value and (ii) a fractional scan path position;

for each input pixel of the plurality of input pixels, calculating an adjusted pixel that corresponds to the input pixel based on (i) a value of the input pixel, (ii) the correlated pixel location in the irregular scan path for the input pixel, (iii) the fractional offset value for the correlated pixel location in the irregular scan path, and (iv) values of one or more input pixels near the input pixel; and producing an output line by retrieving one or more subsets of sequential adjusted pixels, each subset having adjusted pixels that correspond to a same integer offset value.

9. The non-transitory computer-readable medium of claim 8, wherein the irregular scan path corresponds to actual locations of a line of output from an image output device.

10. The non-transitory computer-readable medium of claim 8, wherein the fractional scan path location and the fractional offset value are the same.

11. The non-transitory computer-readable medium of claim 8, wherein the integer offset values of each of the pixel locations in the irregular scan path are selected such that the size of each subset of sequential adjusted pixels satisfies a burst boundary of a memory device.

12. The non-transitory computer-readable medium of claim 11, further comprising, for each of the subsets of sequential adjusted pixels, retrieving from the memory device a plurality of adjusted pixels from an adjusted line of pixels corresponding to the integer offset value.

13. The non-transitory computer-readable medium of claim 8, further comprising retrieving the one or more subsets of sequential adjusted pixels from a memory.

14. The non-transitory computer-readable medium of claim 8, wherein calculating the adjusted pixel comprises interpolation of the adjusted pixel between the input pixel and a nearby input pixel based on the fractional offset value.

15. An image output apparatus comprising:
a memory;
an output engine configured to produce an output image by producing output pixels along a non-uniform scan path; and
a controller configured to process an input image to produce an output image, wherein processing the input image includes:
for each input pixel of the plurality of input pixels, determining an integer offset value with respect to pixel location in an irregular scan path;
for each input pixel of the plurality of input pixels, correlating a location of the input pixel with a pixel location in the irregular scan path to determine (i) a fractional offset value and (ii) a fractional scan path position;
for each input pixel of the plurality of input pixels, calculating an adjusted pixel that corresponds to the input pixel based on (i) a value of the input pixel, (ii) the correlated pixel location in the irregular scan path for the input pixel, (iii) the fractional offset value for the correlated pixel location in the irregular scan path, and (iv) values of one or more input pixels near the input pixel;
producing an output line by retrieving one or more subsets of sequential adjusted pixels, each subset having adjusted pixels that correspond to a same integer offset value; and
providing the output line to the output engine.

16. The image output apparatus of claim 15, wherein the output engine comprises a laser printer engine.

17. The image output apparatus of claim 15, wherein the integer offset values of each of the pixel locations in the non-uniform scan path are selected such that the size of each subset of sequential adjusted pixels satisfies a burst boundary of a memory device.

18. The image output apparatus of claim 15, wherein the memory comprises a Dynamic Random Access Memory (DRAM).

19. The image output apparatus of claim 15, wherein producing the adjusted pixel comprises interpolation of the adjusted pixel between the input pixel and a nearby input pixel based on the fractional offset value.

20. The image output apparatus of claim 15, wherein the irregular scan path corresponds to actual locations of a line of output from the image output apparatus.

* * * * *